US008254822B2

(12) United States Patent
Yamamoto

(10) Patent No.: US 8,254,822 B2
(45) Date of Patent: Aug. 28, 2012

(54) IMAGE FORMING APPARATUS AND PROCESS CARTRIDGE HAVING INCLINED PARTITIONING UNIT

(75) Inventor: Mitsuo Yamamoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 360 days.

(21) Appl. No.: 12/616,209

(22) Filed: Nov. 11, 2009

(65) Prior Publication Data

US 2010/0322686 A1 Dec. 23, 2010

(30) Foreign Application Priority Data

Jun. 23, 2009 (JP) ................................ 2009-148209

(51) Int. Cl.
*G03B 21/00* (2006.01)

(52) U.S. Cl. ....................................... 399/358; 399/123

(58) Field of Classification Search .................. 399/107, 399/111, 123, 343, 350, 358–360
See application file for complete search history.

(56) References Cited

U.S. PATENT DOCUMENTS

| | | | | |
|---|---|---|---|---|
| 4,878,088 A * | 10/1989 | Nakanishi et al. | ............ | 399/119 |
| 5,617,194 A * | 4/1997 | Morishita et al. | ............. | 399/349 |
| 5,890,048 A | 3/1999 | Hirota | | |

FOREIGN PATENT DOCUMENTS

| | | |
|---|---|---|
| JP | 07-140869 A | 6/1995 |
| JP | 08-063068 A | 3/1996 |
| JP | 10-268724 A | 10/1998 |
| JP | 11-231741 A | 8/1999 |
| JP | 2000-056650 A | 2/2000 |

* cited by examiner

*Primary Examiner* — Hoan Tran
(74) *Attorney, Agent, or Firm* — Sughrue Mion, PLLC

(57) ABSTRACT

According to an aspect of the invention, an image forming apparatus includes a removing unit, a conveying unit, a partitioning unit. The removing unit includes an edge portion and removes toner on an image carrier while the tip end contacts the image carrier. The conveying unit conveys, toward an axial direction of the conveying unit, the toner removed from the image carrier and moved above the removing unit, the conveying unit being disposed above the removing unit. The partitioning unit is inclined to a conveying direction of the conveying unit and is disposed above the removing unit through a space.

14 Claims, 3 Drawing Sheets

IMAGE FORMING APPARATUS AND PROCESS CARTRIDGE HAVING INCLINED PARTITIONING UNIT

CROSS-REFERENCE TO RELATED APPLICATIONS

This application is based upon and claims priority under 35 USC 119 from Japanese Patent Application No. 2009-148209, filed Jun. 23, 2009.

BACKGROUND

Technical Field

The present invention relates to an image forming apparatus and a process cartridge.

SUMMARY OF THE INVENTION

According to an aspect of the invention, an image forming apparatus includes a removing unit, a conveying unit, and a partitioning unit. The removing unit includes an edge portion and removes toner from an image carrier while the tip end contacts the image carrier. The conveying unit conveys, toward an axial direction of the conveying unit, the toner removed from the image carrier and moved above the removing unit, the conveying unit being disposed above the removing unit. The partitioning unit is inclined to a conveying direction of the conveying unit and is disposed above the removing unit through a space.

BRIEF DESCRIPTION OF THE DRAWINGS

Exemplary embodiments of the invention will be described in detail based on the following figures, wherein.

DETAILED DESCRIPTION

1. First Exemplary Embodiment (Schematic Configuration of Printer)

Figure 1:
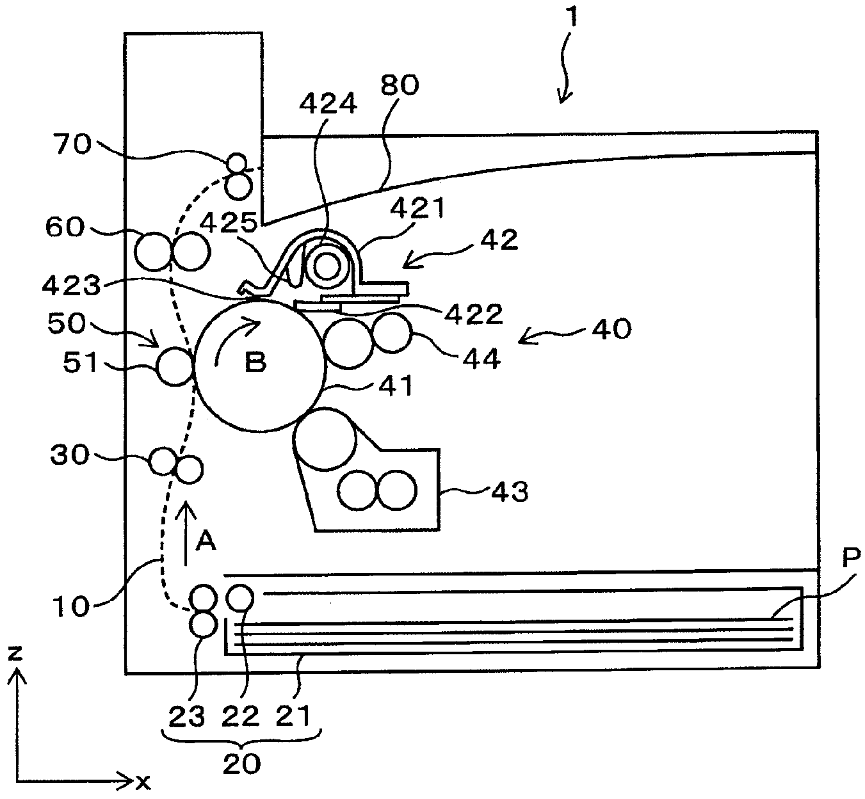
FIG. 1 is a schematic diagram showing a printer.

Hereinafter, an exemplary embodiment of the invention will be described with reference to the drawings. First, the configuration of a printer which is an example of the image forming apparatus will be schematically described with reference to FIG. 1. In FIG. 1, the z-axis direction coincides with the vertical upper direction. The y direction is defined as a direction which is perpendicular to the Z- and x-axes, and which is directed from the front side of the sheet to the rear side. In the other figures, the directions of the coordinate axes are indicated with respect FIG. 1.

In FIG. 1, the reference numeral 1 denotes the printer. In the printer 1, a sheet transporting path 10 for transporting a sheet P which is an example of a recording medium in the direction of arrow A in FIG. 1 is formed in a direction from a bottom portion of the printer 1 toward the upper side. In the printer 1, a sheet supplying device 20, a registration roll pair 30 for regulating the position of the sheet P, an image forming unit

40, a transferring device 50, a fixing device 60, and a discharging device 70 are disposed along the sheet transporting path 10 with starting from the downstream side of the sheet transporting path 10. The printer 1 prints a black-and-white image onto the sheet P.

In the printer 1, image data are supplied from an image outputting apparatus (not shown) such as a personal computer or an image reading apparatus, to a controller (not shown) via a predetermined communication line. Based on the supplied image data, the controller (not shown) issues a control command for image formation to the image forming unit 40, etc. The controller (not shown) controls the operation of the whole printer 1 including the image forming operation.

The sheet supplying device 20 is disposed in a bottom portion of the printer 1. The sheet supplying device 20 includes: a sheet storing portion 21 on which sheets P are stacked; a pick-up roll 22 which pulls out one sheet P from the sheet storing portion 21; and a feed roll pair 23 which conveys the sheet P from the sheet supplying device 20 into the sheet transporting path 10. The sheet supplying device 20 supplies the sheet P.

The registration roll pair 30 is disposed downstream of the sheet supplying device 20 in the transporting direction (the direction of arrow A in FIG. 1) of the sheet P. The registration roll pair 30 feeds the sheet P which is pulled out from the sheet storing portion 21 and fed into the sheet transporting path 10, into the transferring device 50 at a predetermined timing.

The image forming unit 40 is disposed in a middle portion of the printer 1. The image forming unit 40 has a photosensitive drum 41 which is an example of an image carrier. The photosensitive drum 41 is formed into a columnar or cylindrical shape. The side face of the photosensitive drum 41 is contacted with the sheet P. The photosensitive drum 41 is rotated in the direction of arrow B in FIG. 1, and holds a toner image.

In the image forming unit 40, in the periphery of the photosensitive drum 41, a cleaning device 42 which cleans the surface of the photosensitive drum 41, a charging device 44 which charges the surface of the photosensitive drum 41, and a developing device 43 which develops an electrostatic latent image formed on the surface of the photosensitive drum 41 are disposed in this sequence along the direction of arrow B in FIG. 1.

According to the image forming unit 40, the rotating photosensitive drum 41 is charged by the charging device 44, and an electrostatic latent image corresponding to image data is formed on the surface of the photosensitive drum 41. Then, the electrostatic latent image formed on the surface of the photosensitive drum 41 is passed through the developing device 43, whereby a toner is supplied from the developing device 43 to the surface of the photosensitive drum 41, so that the toner remains only on the electrostatic latent image to develop a toner image. After the toner image on the photosensitive drum 41 is transferred to the sheet P, the toner remains on the surface of the photosensitive drum 41. The remaining toner is removed from the surface of the photosensitive drum 41 by the cleaning device 42.

The transferring device 50 is disposed at a position opposed to the photosensitive drum 41. The transferring device 50 has a transferring roll 51. The transferring roll 51 is rotated while generating a transfer pressure with respect to the photosensitive drum 41. In the transferring device 50, the sheet P which is conveyed from the sheet storing portion 21 is inserted between the transferring roll 51 and the photosensitive drum 41 in timing with the toner image on the photosensitive drum 41, and then the toner image is transferred onto the surface of the sheet P. The sheet P on which the toner image is transferred is sent to the fixing device 60.

The fixing device 60 is disposed downstream of the transferring device 50 in the conveying direction (the direction of arrow A in FIG. 1) of the sheet P. The fixing device 60 includes a heating roll and a pressure roll. The fixing device 60 conveys the sheet P while pressurizing and heating between the heating roll and the pressure roll, whereby the transferred image is fixed to the surface of the sheet P. The sheet P to which the transferred image is fixed is sent to the discharging device 70.

The discharging device 70 is disposed downstream of the fixing device 60 in the transporting direction (the direction of arrow A in FIG. 1) of the sheet P. The discharging device 70 discharges the sheet P to which the transferred image is fixed by the fixing device 60, to a discharging portion 80 which is formed in an upper portion of the printer 1.

(Configuration of Cleaning Device)

Figure 2:
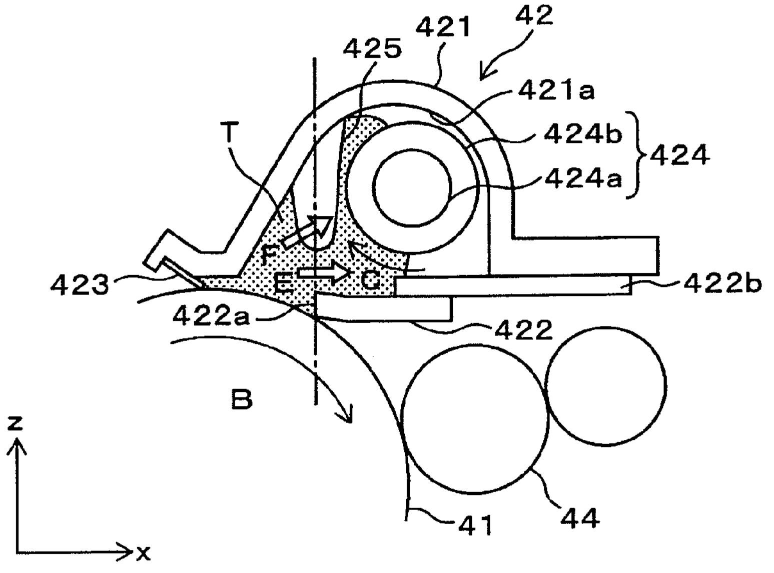
FIG. 2 is a schematic diagram showing a cleaning device.

Next, the cleaning device 42 will be described. The cleaning device 42 cleans the surface of the photosensitive drum 41, and is disposed above the photosensitive drum 41 as shown in FIG. 1. As shown in FIG. 2, the cleaning device 42 includes: a housing 421 which is an example of a housing unit; a cleaning blade 422 which is an example of a removing unit; a sealing member 423; a conveying member 424 which is an example of a conveying unit; partition plates 425 which are an example of partitioning members; and the like.

The housing 421 is a box-like container in which the side opposed to the photosensitive drum 41 is opened. The cleaning blade 422 is fixed to one edge of the opening of the housing 421 through a bracket 422*b*. The sealing member 423 is fixed to the other edge of the opening of the housing 421. The conveying member 424 and the partition plates 425 are disposed in the housing 421. The housing 421 houses the toner (hereinafter, referred to as waste toner) T which is removed by the cleaning blade 422.

The cleaning blade 422 is disposed so as to be contacted with an upper portion of the photosensitive drum 41 which extends downstream of the apex of the photosensitive drum 41 in the rotation direction or the photosensitive drum 41 (the direction of arrow B in FIG. 2).

The cleaning blade 422 is formed by a resin material so as to be wider than the width of a region of the photosensitive drum 41 where a toner image is to be formed.

The width is a length along an axial direction of the photosensitive drum 41. An edge portion 422*a* of the cleaning blade 422 is contacted with the surface of the photosensitive drum 41. The rear end of the cleaning blade 422 is fixed to the one edge of the opening of the housing 421. The cleaning blade 422 removes a toner remaining on the surface of the photosensitive drum 41.

The removed waste toner T accumulates in the vicinity of the edge portion 422*a* of the cleaning blade 422. The waste toner T which accumulates on the photosensitive drum 41 functions as a lubricant to reduce wear of the photosensitive drum 41 due to the cleaning blade 422. By contrast, the waste toner T which, by the rotational force of the photosensitive drum 41 and pushing by the waste toner T, is caused to pass above the cleaning blade 422 and move into the interior of the housing 421 accumulates on the cleaning blade 422, and receives the force of movement from the toner accumulating on the edge portion of the cleaning blade, and that of pushing back from a conveyor vane 424*b* of the conveying member 424, thereby increasing the pressing force of the cleaning blade 422 against the photosensitive drum 41.

The sealing member 423 is disposed upstream of the cleaning blade 422 in the rotation direction of the photosensitive drum 41 (the direction of arrow B in FIG. 2). The sealing member 423 is a film member made of a resin material. For example, the sealing member 423 is formed by a film of a polyurethane resin (PU). A tip end portion of the sealing member 423 is contacted with the surface of the photosensitive drum 41. The rear end of the sealing member 423 is fixed to the other edge of the opening of the housing 421. The sealing member 423 is contacted with the surface of the photosensitive drum 41 while forming an obtuse angle with respect to the rotation direction of the photosensitive drum, whereby the waste toner is prevented from returning to the photosensitive drum 41.

The conveying member 424 is disposed above the cleaning blade 422, and is disposed at a downstream side of rotational direction of the photosensitive drum 41 with respect to the edge portion 422*a* of the cleaning blade 422 in a direction on a tangent line of the apex of the photosensitive drum 41. The conveying member 424 is disposed in parallel to the length direction of the cleaning blade 422, i.e., the axial direction of the photosensitive drum 41 with which the cleaning blade 422 is contacted. Hereinafter, the side opposite to the downstream side is referred to as the upstream side.

Figure 3:
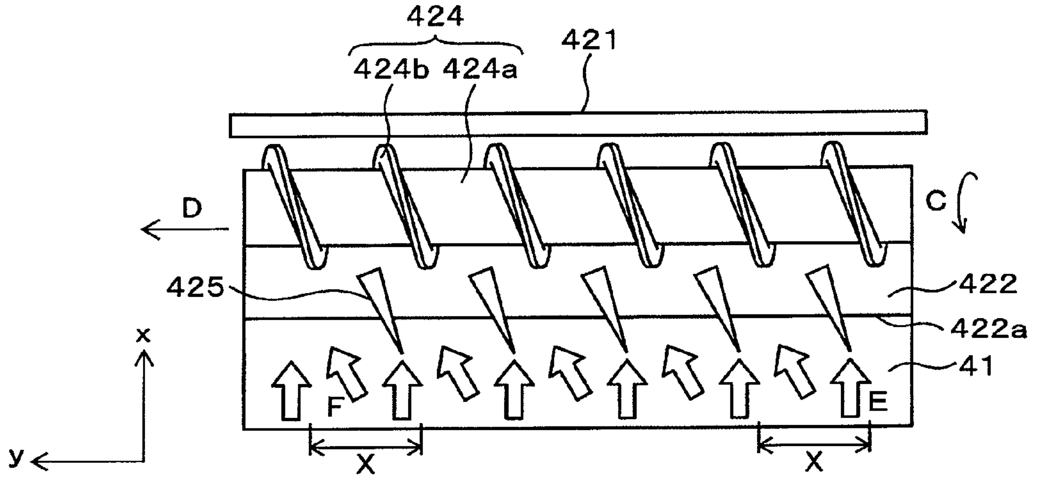
FIG. 3 is a top view showing the cleaning device.

FIG. 3 is a top view showing the cleaning device (a top view as seen in the positive z-axis direction in FIG. 2). As shown in FIG. 3, the conveying member 424 includes the spiral conveyor vane 424*b* which is in the periphery of a rotation shaft 424*a*, and which is an example of a spiral member. When the rotation shaft 424*a* is rotated in the direction of arrow C in FIG. 3, the conveyor vane 424*b* is rotated, and the conveying member 424 conveys the waste toner T in the axial direction (in the direction of arrow D in FIG. 3) to discharge the toner from a discharge port (not shown).

As shown in FIG. 2, the partition plates 425 are fixed to an inner face 421*a* of the housing 421 so as to form a space with respect to the cleaning blade 422. The partition plates 425 are disposed from the upstream side to the downstream side with respect to the edge portion 422*a*. As shown in FIG. 3, the partition plates 425 are inclined so that the end portions of the downstream side are directed toward the conveying direction (the direction of arrow D in FIG. 3) of the waste toner T when viewed from the upper side.

The plural partition plates 425 are disposed at regular intervals over the whole width of the cleaning blade 422 so as to partition the inner space of the housing 421. The partition plates 425 are plate-like members. The partition plates 425 are formed in such a manner that end portions on the upstream side are thinner than those on the downstream side. The partition plates 425 are formed in such a manner that the lower end is thinner than the upper end. According to the configuration, the moving waste toner T is prevented from being blocked by the tip ends of the partition plates 425.

(Operation of Printer)

Next, the operation of the printer 1 will be described. In the printer 1, a toner image formed on the surface of the photosensitive drum 41 is transferred to the sheet P conveyed from the sheet supplying device 20, and then the sheet P is sent to the fixing device 60. The transferred image is fixed to the sheet P by the fixing device 60, and then the sheet P is discharged to the discharging portion 80 by the discharging device 70.

(Operation of Cleaning Device)

Next, the operation of the cleaning device 42 will be described. A part of a toner T which is supplied from the developing device 43 to the surface of the photosensitive drum 41 is not transferred and remains on the photosensitive drum 41. The remaining toner T is removed from the surface of the photosensitive drum 41 by the cleaning blade 422.

On the other hand, sometimes, paper dust is produced in right and left end portions of the sheet P as viewed in the transporting direction (the direction of arrow A in FIG. 1) of the sheet P, and a portion of the sheet P which is contacted with, for example, the transporting rolls such as transporting roll pair 23. The produced paper dust adheres to the surface of the photosensitive drum 41 which is contacted with the portions where the paper dust is produced. The paper dust is removed from the surface of the photosensitive drum 41 by the cleaning blade 422.

The waste toner T removed by the cleaning blade 422 accumulates in the vicinity of the tip end of the cleaning blade 422. Also, the paper dust removed by the cleaning blade 422 accumulates in the vicinity of the tip end of the cleaning blade 422. In some cases, the toner T and the toner dust are mixed with each other to form a block. A block in which the toner and paper dust are mixed with each other is hardly moved in particularly the conveying direction of the waste toner, as compared with the case where only a toner is conveyed.

The waste toner T in the space (hereinafter, referred to as the lower layer) between the cleaning blade 422 and the partition plates 425 is moved in the direction (the direction of arrow E in FIG. 3) of the rotational tangent line of the apex of the photosensitive drum 41. By contrast, the waste toner T in a portion above the lower layer (hereinafter, the portion is referred to as the upper layer) is caused by the partition plates 425 to be moved in the direction of arrow F in FIG. 3. In this way, between the upper and lower layers, the moving direction of the waste toner T is different. Therefore, the waste toner T which is formed, for example, as a block is loosened.

Then, the waste toner T which is moved in the directions of arrows E and F in FIG. 3 is contacted with the conveyor vane 424*b* of the conveying member 424 to be conveyed by the conveyor vane 424*b* of the conveying member 424, and then discharged from the discharge port (not shown).

(Superiority of Printer)

The thus configured printer 1 includes the partition plates 425, and hence the moving direction of the waste toner T is different between the upper and lower layers, so that the waste toner T which is formed for example as a block is loosened. Therefore, the waste toner T is conveyed more easily, and a cleaning failure due to clogging with toner which is not conveyed is prevented from occurring.

In the thus configured printer 1, the partition plates 425 are disposed on the downstream side with respect to the edge portion 422*a*, and hence the waste toner T on the cleaning blade 422 is moved in the axial direction of the photosensitive drum 41. Even when the amount of accumulation of the waste toner T is varied along the axial direction of the photosensitive drum 41, therefore, the difference in accumulation amount of the waste toner T is reduced, so that the pressing force of the cleaning blade 422 against the photosensitive drum 41 is prevented from being varied along the axial direction of the photosensitive drum 41. Consequently, a cleaning failure is prevented from occurring, and the difference in amount of wear of the photosensitive drum 41 due to the cleaning blade 422 is reduced.

In the thus configured printer 1, the partition plates 425 are disposed on the upstream side with respect to the edge portion 422*a*, and hence the waste toner T on the photosensitive drum 41 is moved in the axial direction of the photosensitive drum 41. Even when the amount of accumulation of the waste toner T is varied along the axial direction of the photosensitive drum 41, therefore, the difference in accumulation amount of the waste toner T is reduced, so that the amount of wear of the photosensitive drum 41 due to the cleaning blade 422 is prevented from being varied along the axial direction of the photosensitive drum 41.

In regions (indicated by X in FIG. 3) corresponding to the right and left end portions of the sheet P as viewed in the transporting direction (the direction of arrow A in FIG. 1) of the sheet P, particularly, paper dust is easily produced, and therefore the waste toner T is easily formed as a block in which the toner is mixed with paper dust. In the thus configured printer 1, the partition plates 425 are disposed at least in the regions X. In the regions X, therefore, the moving direction of a block of the waste toner T is different between the upper and lower layers, and the block of the waste toner T is loosened, so that the block of the waste toner T is prevented from becoming larger.

2. Second Exemplary Embodiment

Figure 4:
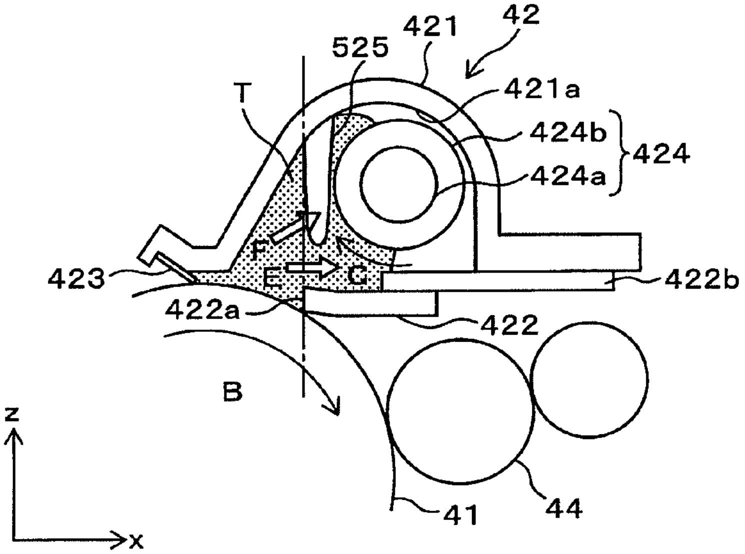
FIG. 4 is a schematic diagram showing a cleaning device of a second exemplary embodiment.
Figure 5:
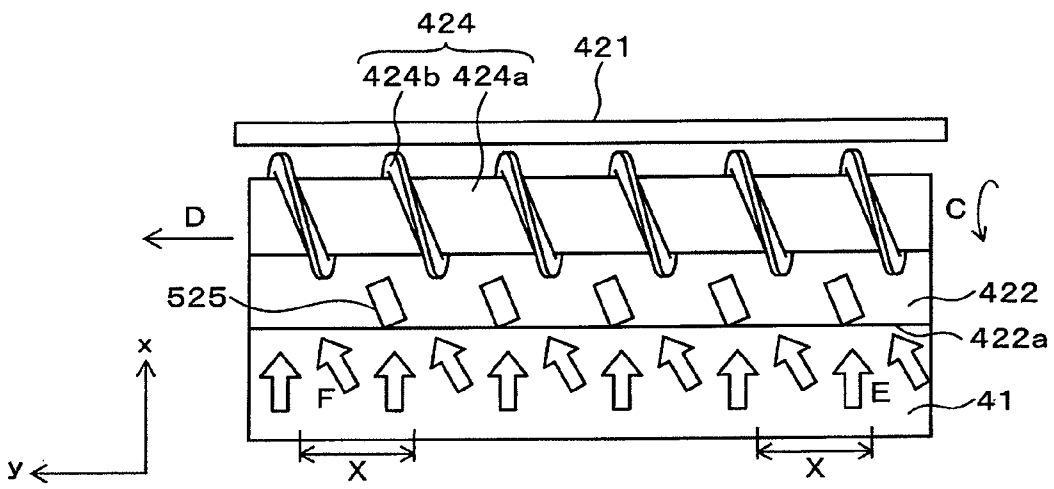
FIG. 5 is a top view showing the cleaning device of the second exemplary embodiment.

The second exemplary embodiment has a configuration in which the partition plates of the first exemplary embodiment are changed. Therefore, description will be made with focusing attention on the partition plates, and description of a similar configuration as the first exemplary embodiment is omitted. FIG. 4 is a schematic diagram showing the cleaning device of the second exemplary embodiment, and FIG. 5 is a top view showing the cleaning device of the second exemplary embodiment (a top view as seen in the positive z-axis direction in FIG. 4).

As shown in FIG. 4, the partition plates 525 are fixed to the inner face 421*a* of the housing 421 so as to form a space with respect to the cleaning blade 422. The partition plates 525 are disposed only in the downstream side with respect to the edge portion 422*a*. As shown in FIG. 5, the partition plates 525 are inclined so that the end portions in the direction (the direction of arrow E in FIG. 5) of a rotational tangent line of the apex of the photosensitive drum 41 are directed toward the conveying direction (the direction of arrow D in FIG. 5) of the waste toner T when viewed from the upper side.

The plural partition plates 525 are disposed at regular intervals over the whole width of the cleaning blade 422 so as to partition the inner space of the housing 421. The partition plates 525 are plate-like members. The partition plates 525 are formed in such a manner that one end portions in the rotational tangent line direction (the direction of arrow E in FIG. 5) of the apex of the photosensitive drum 41 have the same thickness as the other end portions.

In the second exemplary embodiment, the partition plates 525 are disposed only in the downstream side with respect to the edge portion 422*a*, and hence the waste toner T on the cleaning blade 422 is moved in the axial direction of the photosensitive drum 41. Even when the amount of accumulation of the waste toner T is varied along the axial direction of the photosensitive drum 41, therefore, the difference in accumulation amount of the waste toner T is reduced, so that the pressing force of the cleaning blade 422 against the photosensitive drum 41 is prevented from being varied along the axial direction of the photosensitive drum 41. Consequently, a cleaning failure is prevented from occurring, and the difference in amount of wear of the photosensitive drum 41 due to the cleaning blade 422 is reduced.

3. Third Exemplary Embodiment

The third exemplary embodiment has a configuration in which the positions of the partition plates of the second exemplary embodiment are changed. Therefore, description will be made with focusing attention on the positions of the partition plates, and description of a similar configuration as the second exemplary embodiment is omitted.

Figure 6:
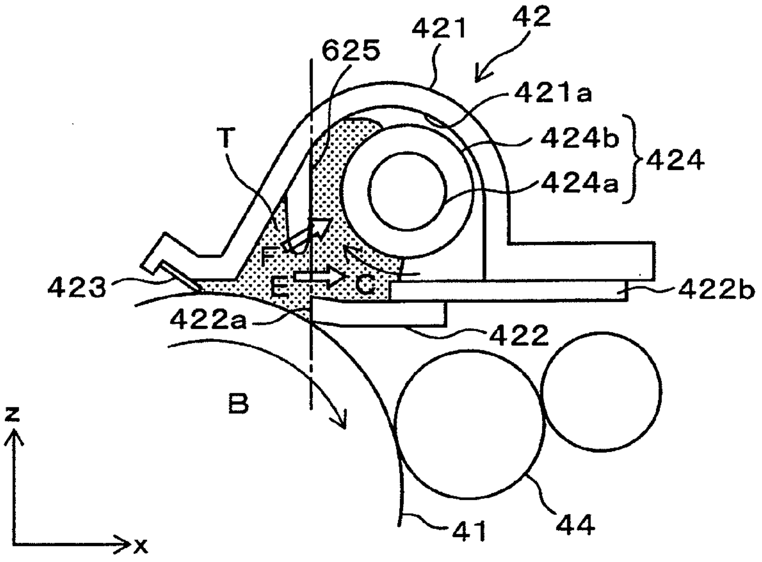
FIG. 6 is a schematic diagram showing a cleaning device of a third exemplary embodiment.

As shown in FIG. 6, the partition plates 625 are fixed to the inner face 421*a* of the housing 421 so as to form a space with respect to the cleaning blade 422. The partition plates 625 are disposed only in the upstream side with respect to the edge portion 422*a*.

In the third exemplary embodiment, the partition plates 625 are disposed only in the upstream side with respect to the edge portion 422*a*, and hence the waste toner T on the photosensitive drum 41 is moved in the axial direction of the photosensitive drum 41. Even when the amount of accumulation of the waste toner T is varied along the axial direction of the photosensitive drum 41, therefore, the difference in accumulation amount of the waste toner T is reduced, so that the amount of wear of the photosensitive drum 41 due to the cleaning blade 422 is prevented from being varied along the axial direction of the photosensitive drum 41.

4. Other Exemplary Embodiments

The partition plates 425 may be disposed only in one of the regions X corresponding to the right or left end portion of the sheet P as viewed in the transporting direction (the direction of arrow A in FIG. 1) of the sheet P, or in a region corresponding to the transporting rolls for transporting the sheet P, such as the transporting roll pair 23. In this case, when the place where the partition plates 425 are disposed is restricted, the production cost of the printer 1 is lowered. The regions X are not restricted to the positions in the first and second exemplary embodiments, and the positions of the regions may be changed depending on, for example, the size of the sheet P to be transported.

[Industrial Applicability]

The invention may be applied to, for example, an image forming apparatus having a scanner function, a facsimile function, or a copy function, or having these functions.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a removing unit that includes an edge portion and that removes toner from an image carrier while the edge portion contacts the image carrier;

a conveying unit that conveys, toward an axial direction of the conveying unit, the toner removed from the image carrier and moved above the removing unit, the conveying unit being disposed above the removing unit; and a partitioning unit that is inclined to the axial direction of the conveying unit, that is disposed above the removing unit, and that is separated from the removing unit by a space.

2. The image forming apparatus according to claim 1 further comprising a housing unit that stores the removed toner, wherein the conveying unit is housed in the housing unit.

3. The image forming apparatus according to claim 2, wherein the partitioning unit is provided on the housing unit.

4. The image forming apparatus according to claim 1, wherein the partitioning unit is disposed directly above the removing unit.

5. The image forming apparatus according to claim 1, wherein the partitioning unit is disposed at a region other than directly above the removing unit.

6. The image forming apparatus according to claim 1, wherein the partitioning unit is disposed at a region corresponding to at least one end portion of a recording medium in a width direction of the recording medium.

7. The image forming apparatus according to claim 1 further comprising a sealing member that is disposed on an upstream side of the direction of an image carrier rotation with respect to the removing unit in a rotational direction of the image carrier.

8. A process cartridge comprising:

an image carrier;

a removing unit that includes an edge portion and removes toner on the image carrier while the edge portion contacts the image carrier;

a conveying unit that conveys, toward an axial direction of the conveying unit, the toner removed from the image carrier and moved above the removing unit, the conveying unit being disposed above the removing unit; and a partitioning unit that is inclined to the axial direction of the conveying unit, that is disposed above the removing unit, and that is separated from the removing unit by a space.

9. The process cartridge according to claim 8 further comprising a housing unit that houses the removed toner, wherein the conveying unit is housed in the housing unit.

10. The process cartridge according to claim 8, wherein the partitioning unit is disposed directly above the removing unit.

11. The process cartridge according to claim 8, wherein the partitioning unit is disposed at a region other than directly above the removing unit.

12. The image forming apparatus according to claim 8, wherein the partitioning unit is disposed at a region corresponding to at least one end portion of a recording medium in a width direction of the recording medium.

13. The process cartridge according to claim 8, wherein the partitioning unit is provided on the housing unit.

14. The process cartridge according to claim 8 further comprising a sealing member that is disposed on an upstream side of the direction of an image carrier rotation with respect to the removing unit in a rotational direction of the image carrier.

* * * * *